UNITED STATES PATENT OFFICE.

CHARLES S. BIRD, OF EAST WALPOLE, MASSACHUSETTS.

COMPOSITION OF MATTER FOR WATERPROOFING PAPER.

SPECIFICATION forming part of Letters Patent No. 332,868, dated December 22, 1885.

Application filed July 20, 1885. Serial No. 172,153. (No specimens.)

*To all whom it may concern:*

Be it known that I, CHARLES S. BIRD, a citizen of the United States, residing at East Walpole, in the county of Norfolk and State of Massachusetts, have invented a new and useful Composition of Matter to be Used for Waterproofing Paper, of which the following is a specification.

My composition consists of the following ingredients, combined in the proportions stated, viz: resin, fifty per cent.; paraffine, forty-five per cent.; silicate of soda, five per cent. These ingredients are to be thoroughly mingled by heating them together, and by agitation.

In using the above-named composition it is placed in a suitable open tank, to which heat is applied in any convenient manner, whereby it is kept hot while being used.

The paper to which the said composition is applied is mainly building or sheathing paper. The latter is taken in the condition in which it comes from the paper-machine, being quite dry. A strip or strips of said paper, from a roll or other convenient holder, are conducted and drawn through said tank of hot composition, whereby the paper becomes well saturated with it, and upon emerging from said tank the paper passes between suitable rolls, which press any surplus composition from it, leaving it hard and smooth.

The aforesaid proportions of resin, paraffine, and silicate of soda are employed generally by me for the purpose set forth; but in some cases, according to the solidity of the texture of the paper to which they are applied, I vary the proportions of resin and of paraffine from five to fifteen per cent. from those stated, but retaining about five per cent. of silicate of soda, as set forth. Thus the proportions of resin and paraffine may vary, under said conditions, between fifty and sixty-five per cent. of the former, and between forty-five and thirty of the latter, making a composition consisting of said ingredients by which the paper is rendered water-proof and durable when exposed to the weather, and by the combined effects of said ingredients the proper degree of waterproofing effect is produced, and a surface-finish both smooth and hard is obtained.

What I claim as my invention is—

The herein-described composition of matter to be used for waterproofing paper, consisting of resin, paraffine, and silicate of soda in about the proportions specified.

CHAS. S. BIRD.

Witnesses:
SAMUEL BIRD,
HARRISON H. CHILD.